US006563678B2

United States Patent
Sato

(10) Patent No.: US 6,563,678 B2
(45) Date of Patent: *May 13, 2003

(54) THIN-FILM MAGNETIC HEAD HAVING INSOLATING LAYER PROVIDED BETWEEN GAP LAYER AND SHIELDING LAYER

(75) Inventor: Kiyoshi Sato, Niigata-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,624

(22) Filed: Oct. 6, 1999

(65) Prior Publication Data

US 2002/0167765 A1 Nov. 14, 2002

(30) Foreign Application Priority Data

Oct. 8, 1998 (JP) .............................. 10-286389
Apr. 23, 1999 (JP) .............................. 11-116712

(51) Int. Cl.$^7$ .............................. G11B 5/39; G11B 5/10
(52) U.S. Cl. .............................. 360/320; 360/319
(58) Field of Search .............................. 360/320, 128, 360/319, 321

(56) References Cited

U.S. PATENT DOCUMENTS 5,168,409 A * 12/1992 Koyama et al.
5,568,335 A * 10/1996 Fontana et al.
5,633,771 A * 5/1997 Yoda et al.
5,701,221 A 12/1997 Taniyama et al.
5,707,538 A 1/1998 Shen et al.
5,721,008 A 2/1998 Huang et al.
5,766,780 A 6/1998 Huang et al.
5,850,324 A 12/1998 Wu et al.
5,897,969 A 4/1999 Taniyama et al.
5,978,183 A * 11/1999 Hsiao et al.
5,999,379 A * 12/1999 Hsiao et al.
6,025,977 A * 2/2000 Hu et al.
6,160,687 A * 12/2000 Pinarbasi

FOREIGN PATENT DOCUMENTS

| JP | 7-114714 | 5/1995 |
| JP | 7-282423 | 10/1995 |
| JP | 8-138213 | 5/1996 |
| JP | 9-106513 | 4/1997 |

* cited by examiner

Primary Examiner—Craig A. Renner
(74) Attorney, Agent, or Firm—Brinks Hofer Gilson & Lione

(57) ABSTRACT

A thin-film magnetic head having a magnetoresistive effect element wherein an insulating layer is formed under an electrode layer of a magnetoresistive effect element with a lower gap layer interposed therebetween. As a result, the distance between the electrode layer and the lower shielding layer becomes longer, thus permitting maintenance of a satisfactory electrical insulation.

5 Claims, 9 Drawing Sheets

US 6,563,678 B2

THIN-FILM MAGNETIC HEAD HAVING INSOLATING LAYER PROVIDED BETWEEN GAP LAYER AND SHIELDING LAYER

BACKGROUND OF THE INVENTION

1. Field of the Invention

The present invention relates to a thin-film magnetic head having a magnetoresistive effect element using the magnetoresistive effect of a spin valve film or the like. More particularly, the present invention relates to a thin-film magnetic head giving an improved electrical insulation between the electrode layer of the, magnetoresistive effect element and the lower shielding layer, and a manufacturing method thereof.

2. Description of the Related Art

FIG. 21 is an enlarged sectional view illustrating a conventional thin-film magnetic head as viewed from the opposite side of a recording medium (i.e., from the "ABS" or air bearing surface plane). In FIG. 21, symbols X, Y and Z represent an X coordinate axis, a Y coordinate axis, and a Z coordinate axis, respectively.

This thin-film magnetic head is a read head using the magnetoresistive effect, formed on a trailing side end surface of a slider constituting, for example, a floating-type head. The thin-film magnetic head may be a head formed by laminating a write inductive magnetic head on the aforementioned read head, known generally as an MR(magnetoresistive)/inductive composite thin-film magnetic head.

In FIG. 21, the reference numeral 1 represents a lower shielding layer formed from Sendust or an NiFe alloy (permalloy), and a lower gap layer 4 made of a nonmagnetic material such as $Al_2O_3$ (alumina) is formed on the lower shielding layer 1. A magnetoresistive effect element 5 is formed in the form of a film on the above-mentioned lower gap layer 4. A multilayer film 6 using the magnetoresistive effect is formed at the center of the magnetoresistive effect element 5.

The aforementioned multilayer film 6 comprises a spin-valve film (a kind of GMR type of "GmR" or giant magnetoresistive element having, for example, an anti-ferromagnetic layer, a fixed magnetic layer, a non-magnetic conductive layer, and a free magnetic layer. In this spin-valve film, magnetization of the fixed magnetic layer is fixed in a direction perpendicular to the plane of the drawing (Y-direction: height direction), and magnetization of the free magnetic layer is aligned with the track transverse direction (X-direction). When the magnetic field from the recording medium penetrates in the direction perpendicular to the plane of drawing, magnetization of the free magnetic layer varies, and electric resistance varies under the effect of the relationship between fixed magnetization of the fixed magnetic layer and varying magnetization of the free magnetic layer, thus reproducing the magnetic field of the recording.

As shown in FIG. 21, a hard bias layer 7 and an electrode layer 8 made of a non-magnetic conductive material having a low electric resistance such as Cr (chromium) or Ta (tantalum) are formed as a longitudinal bias layer on each side of the multilayer film 6.

An upper gap layer 9 is formed on the magnetoresistive effect element 5, and further, an upper shielding layer 10 is formed on the upper gap layer 9.

Also as shown in FIG. 21, the lower gap length GL1 is determined from the thickness of the lower gap layer 4 formed under the magnetoresistive effect element 5, and the upper gap length GL2 is determined from the thickness of the upper gap layer 9 formed on the magnetoresistive effect element 5. The read gap length GL is set from the thickness of the magnetoresistive effect element 5, the lower gap length GL1 and the upper gap length GL2.

FIG. 22 is a plan view of the magnetoresistive effect element 5 formed on the lower gap layer 4. As shown in FIG. 22, the multilayer film 6 and the electrode layer 8 forming the magnetoresistive effect element 5 are exposed to the ABS plane serving as an opposite surface to the recording medium, and the electrode layer 8 extends to the rear side (Y-direction: height direction) from the multilayer film 6. The electrode layer 8 is formed so as to become larger in width toward the rear side.

Along with the recent tendency toward a higher recording density, it is necessary to form the lower gap length GL1 and the upper gap length GL2 shown in FIG. 21 into smaller sizes.

However, when the gap layers 4 and 9 are formed into smaller thickness with a view to reducing the sizes of the lower gap length GL1 and the upper gap length GL2, defects such as pinholes are produced in the gap layers 4 and 9 (which serve to maintain insulation between the shielding layers 1 and 10 and the magnetoresistive effect element 5), resulting in electric connection between the shielding layers 1 and 10 and the magnetoresistive effect element 5.

Particularly, the above-mentioned problem tends to be created between the electrode layer 8 having a large width formed on the rear side from the ABS plane and the shielding layers 1 and 10 as shown in FIG. 22, resulting in a lower reproducing property due to electric connection between the shielding layers 1 and 10 and the electrode layer 8.

Upon manufacturing a thin-film magnetic head, the ABS plane of the multilayer film 6 is ground (height-making fabrication in the height direction (Y-direction in FIG. 22), until a specified DC resistance of the multilayer film 6 (shown in FIG. 22): s obtained. This height-making fabrication causes smearing between the shielding layers 1 and 10 and the electrode layer 8, tending to make electric connection between the shielding layers 1 and 10 and the electrode layer 8.

When the shielding layers 1 and 10 and the electrode layer 8 are electrically connected, the height-making fabrication cannot be applied because of inaccurate measuring of the DC resistance of the multilayer film 6.

SUMMARY OF THE INVENTION

The present invention was developed for the purpose of solving the conventional problems as described above, and relates to a thin-film magnetic shead which can maintain an appropriate electric insulation between the shielding layer and electrode layer of the magnetoresistive effect element even for a small gap length and permits obtaining a stable reproducing property, thereby coping with the tendency toward a higher recording density, and a manufacturing method thereof.

The present invention provides a thin-film magnetic head comprising a lower shielding layer and a lower gap layer formed thereon, a magnetoresistive element comprising a multilayer film displaying magnetoresistive effect and formed on said lower gap layer and an electrode layer connected to said multilayer film, and an upper shielding layer formed on the magnetoresistive effect element via the upper gap layer; wherein an insulating layer is formed in addition to the lower gap layer between the electrode layer and the lower shielding layer.

In the invention, the insulating layer should preferably be arranged at least on each side of the multilayer film or a reproducing track width.

In the invention, furthermore, the lower gap layer and the insulating layer should preferably have a total thickness of at least 700 Å.

In a detailed structure in the invention, an insulating layer should preferably be formed on the lower shielding layer, and the electrode layer should preferably be formed on the insulating layer with the lower gap layer interposed therebetween.

A slant should preferably be formed on each of the sides of the insulating layer.

In the invention, the insulating layer should preferably be formed with one or more insulating materials selected from the group consisting of $SiO_2$, $Al_2O_3$, $Ta_2O_5$, $TiO$, $Ti_2O_3$, $Ti_3O_5$, $WO_3$, $Si_3N_4$ and $AlN$.

In a detailed structure in the invention, a recess should preferably be formed on the surface of the lower shielding layer, with an insulating layer formed in the recess, and the electrode should preferably be formed on the insulating layer with the lower gap layer interposed therebetween.

In this case, the surface of the lower shielding layer should preferably be flush with the surface of the insulating layer formed in the recess of the lower shielding layer.

In the invention, the insulating layer formed under the electrode layer should preferably be formed by exposing up to an ABS plane.

As in the configuration described above, in the invention, it is possible to maintain a satisfactory level of electric insulation between the electrode layer and the shielding layer by forming an insulating layer, in addition to the lower gap layer, between the electrode layer and the lower shielding layer.

The invention further provides a thin-film magnetic head comprising a lower shielding layer and a lower gap layer formed thereon, a magnetoresistive effect element comprising a multilayer film displaying a magnetoresistive effect and formed on said lower gap layer and an electrode layer connected to the multilayer film, and an upper shielding layer formed on the magnetoresistive effect element with the upper gap layer interposed therebetween; wherein an insulating layer is formed in addition to the upper gap layer between the electrode layer and the upper shielding layer.

In the invention, the insulating layer should preferably be arranged at least on each of the both sides of the multilayer film or a reproducing track width.

In the invention, furthermore, the lower gap layer and the insulating layer should preferably have a total thickness of at least 700 Å.

In the invention, an insulating layer should preferably be formed on the electrode layer with the upper gap layer interposed therebetween. A slant should preferably be formed on each of the sides of the insulating layer.

In the invention, furthermore, the insulating layer should preferably be formed with one or more insulating materials selected from the group consisting of $SiO_2$, $Al_2O_3$, $Ta_2O_5$, $TiO$, $Ti_2O_3$, $Ti_3O_5$, $WO_3$, $Si_3N_4$ and $AlN$.

In another detailed structure in the invention, an insulating layer should preferably be formed on the electrode layer, and further, an upper gap layer should preferably be formed on the insulating layer.

In the invention, the insulating layer formed on the electrode layer should preferably be formed by exposing up to an ABS plane.

As in the above-mentioned configuration of the invention, it is possible to maintain a satisfactory level of electric insulation between the electrode layer and the shielding layer by forming the insulating layer, in addition to the upper gap layer, between the electrode layer and the upper shielding layer.

The present invention further provides a thin-film magnetic head comprising a lower shielding layer and a lower gap layer formed thereon, a magnetoresistive effect element having a multilayer film formed on the lower gap layer and connected to the multilayer film, and an upper shielding layer formed on the magnetoresistive effect element via the upper gap layer; wherein the insulating layer is formed between the electrode layer and the lower shielding layer, and the insulating layer is formed between the electrode layer and the upper shielding layer.

Further, the invention provides a manufacturing method of a thin-film magnetic head, comprising:
 a step of forming an insulating material layer on a lower shielding layer;
 a step of forming a resist layer on the insulating material layer;
 a step of removing the insulating material layer not covered with the resist layer to retain the insulating material layer formed under the resist layer as an insulating layer;
 a step of forming a lower gap layer on an area covering the insulating layer and the lower shielding layer, after removing the resist layer;
 a step of forming an electrode layer of a magnetoresistive effect element on the lower gap layer overlapping the insulating layer, and forming a multilayer film displaying magnetoresistive effect on the lower gap layer; and
 a step of forming an upper gap layer on the magnetoresistive effect element formed on the lower gap layer, and forming an upper shielding layer on the upper gap layer.

When using the above-mentioned manufacturing method, it is recommendable to form a slant on a side of the insulating layer retained under the resist layer by the use of isotropic etching after forming the resist layer on the insulating material layer.

Or, it is desirable to form a resist layer on the insulating material layer, then, form a slant on a side of the resist layer surface by applying a heat treatment to the resist layer, and form a slant on the other side of the insulating layer under the resist layer by the use of anisotropic etching.

In order to use isotropic etching or anisotropic etching, it is desirable to form the insulating material layer with one or more insulating materials selected from the group consisting of $SiO_2$, $Al_2O_3$, $Ta_3O_5$, $TiO$, $Ti_2O_3$, $Ti_3O_5$, $WO_3$, $Si_3N_4$ and $AlN$.

In the present invention, the aforementioned method for forming the insulating layer upon forming the insulating layer on the electrode layer with the upper gap layer interposed therebetween.

The invention further provides a manufacturing method of a thin-film magnetic head, comprising:
 a step of forming a resist layer for lifting off on a lower shielding layer;
 a step of forming a recess on the surface of the lower shielding layer by applying etching to the surface of the lower shielding layer not covered with the resist layer;

a step of forming an insulating layer in the recess formed on the surface of the lower shielding layer;

a step of removing the resist layer and forming a lower gap layer on an area covering the insulating layer and the lower shielding layer;

a step of forming an electrode layer of a magnetoresistive effect element on the lower gap layer overlapping the insulating layer, and forming a multilayer film displaying a magnetoresistive effect on the lower gap layer not having an insulating layer formed thereon; and a step of forming an upper gap layer on the magnetoresistive effect element formed on the lower gap layer, and further, forming an upper shielding layer on the upper gap layer.

When using the aforementioned manufacturing method, it is desirable to form the insulating layer in a recess formed on the lower shielding layer so that the surface of the insulating layer is flush with the surface of the lower shielding layer.

By using the aforementioned manufacturing method, it is possible to easily form the insulating layer between the shielding layer and the electrode layer, and hence, to achieve satisfactory electric insulation between the shielding layer and the electrode layer.

The present invention further provides a manufacturing method of a thin-film magnetic head, comprising:

a step of forming a multilayer film displaying a magnetoresistive effect on the entire surface of the lower gap layer;

a step of forming a lift-off resist layer on the multilayer film, and removing the multilayer film not covered with the lift-off resist layer by etching;

a step of forming an electrode layer on the lower gap layer, from which the multilayer film has been removed in the preceding step, and forming an insulating layer on the electrode layer; and a step of removing the lift-off resist layer, and forming the upper gap layer on an area covering the multilayer film and the insulating layer.

By using this method, it is possible to easily form the insulating layer in addition to the upper gap layer between the electrode layer and the upper shielding layer. According to the aforementioned method, furthermore, it is possible to completely cover the entire upper surface of the electrode layer with the insulating layer, thus permitting maintenance of a further better electric insulation between the upper shielding layer and the electrode layer.

DESCRIPTION OF THE PREFERRED EMBODIMENTS

Figure 1:
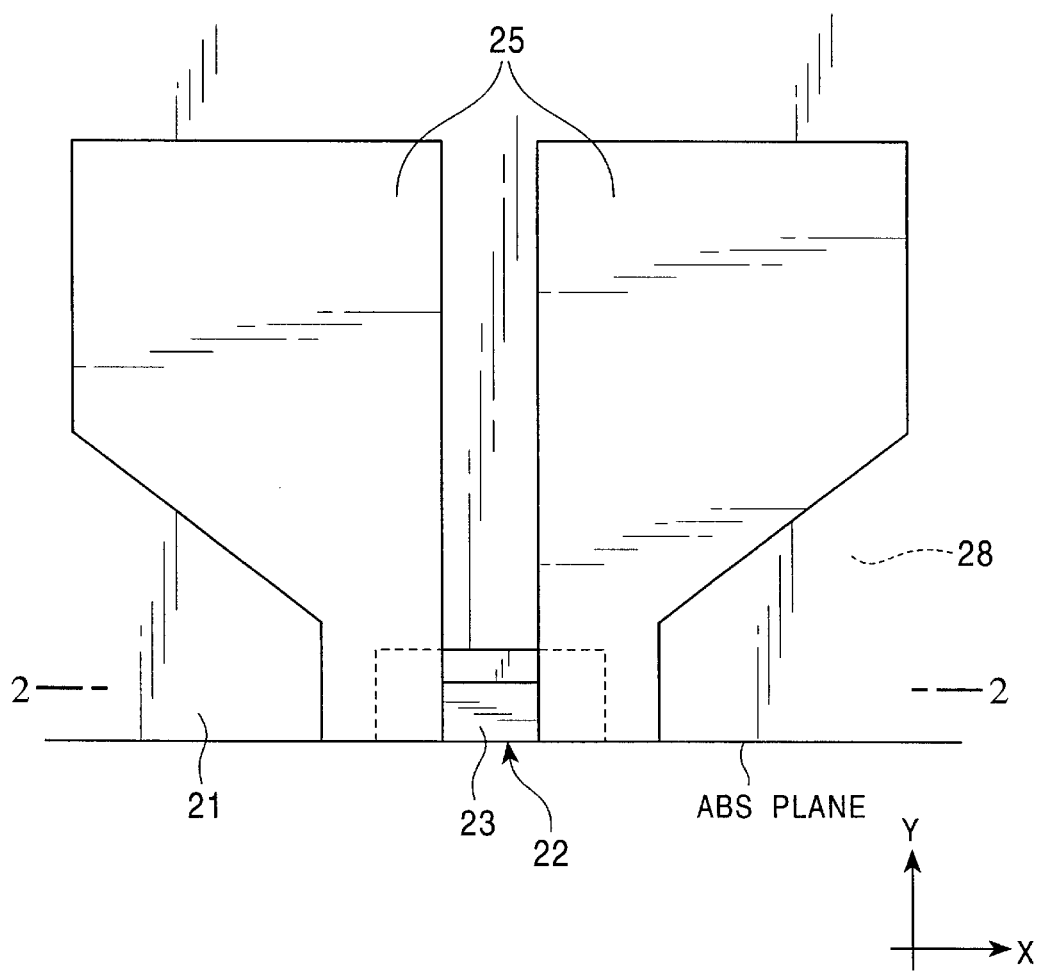
FIG. 1 is a partial plan view illustrating the structure of a magnetoresistive effect element forms on a lower gap layer in the present invention.
Figure 2:
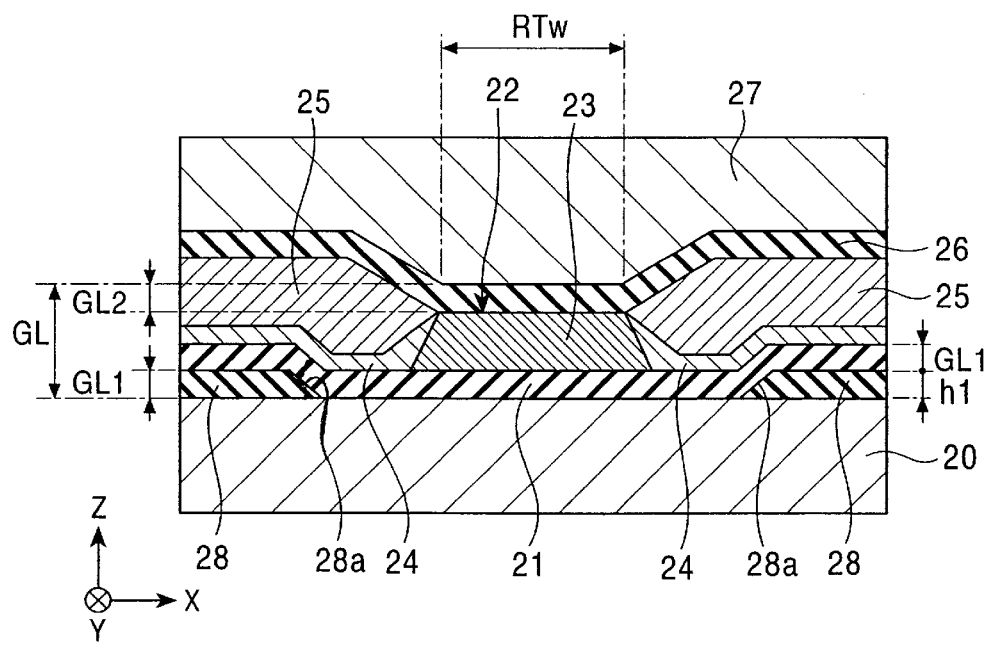
FIG. 2 is a partial sectional view of FIG. 1 cut along the line 2—2.

FIG. 1 is a partial plan view of a magnetoresistive effect element formed in a thin-film magnetic head (read head) of the present invention; and FIG. 2 is a partial sectional view of the thin-film magnetic head shown in FIG. 1 cut along the line 2—2. In FIG. 2, symbols X, Y and Z represent an X coordinate axis, a Y coordinate axis, and a Z coordinate axis, respectively.

The read head detects a leaking magnetic field from a recording medium such as a hard disk by the utilization of magnetoresistive effect to read out a recorded signal. The thin-film magnetic head of the invention may be a head known as a composite thin-film magnetic head in which a write inductive magnetic head is laminated on the read head. The lower shielding layer 20 shown in FIG. 2 made of a soft magnetic material is formed on the trailing end surface of the slider.

As shown in FIG. 2, a lower gap layer 21 made of a non-magnetic material such as $Al_2O_3$ (alumina) is provided on the lower shielding layer 20. A magnetoresistive effect element 22 is formed on the lower gap layer 21. A multilayer film 23 displaying magnetoresistive effect is formed at the center of the magnetoresistive effect element 22. The multilayer film 23 is, for example a GMR element using giant magnetoresistive effect typically represented by a spin-valve film or an AMR element using anisotropic magnetoresistive effect.

The above-mentioned spin-valve film is composed of a four-layer structure comprising an antiferromagnetic layer, a fixed magnetic layer, a non-magnetic conductive layer, and a free magnetic layer, the simplest structure. Of these four layers, the anti-ferromagnetic layer has the largest thickness.

As shown in FIG. 2, a hard bias layer 24 and an electrode layer 25 (Cr (chromium) or Ta (tantalum)) are formed on each of he both sides of the multilayer film 23. For example, a bias magnetic filed is given by the hard magnetic bias layer to the free magnetic layer of the spin-valve valve film, whereby magnetization of the free magnetic layer is aligned in the track width direction. Magnetization of the fixed magnetic layer of the spin-valve film is, on the other hand, fixed by an exchange bonding magnetic field with the anti-ferromagnetic layer in a direction perpendicular to the plane of paper of the drawing (height direction: Y-direction). When the magnetic field from the recording medium enters in a direction perpendicular to the drawing plate, magnetization of the free magnetic layer aligned in the track width direction varies, electric resistance varies under the effect of the relationship between the varying magnetization of the free magnetic layer and the fixed magnetization of he fixed magnetic layer, whereby a recording signal is detected. A reproducing track width RTw is formed by the distance between the electrode layers 25 and 25.

As shown in FIG. 2, the upper gap layer 26 made of $Al_2O_3$ (alumina) is formed on the multilayer film 23 and the electrode layer 25, and further, an upper shielding layer 27 is formed on the upper gap layer 26. When the thin-film magnetic head of the invention is a composite thin-film magnetic head made by laminating the read head and an inductive head, the upper shielding layer 27 simultaneously has a shielding function of the read head and a function as a trailing-side core of the inductive magnetic head.

As shown in FIG. 2, a lower gap length GL1 is determined by the thickness of the lower gap layer 21, and an upper gap length GL2 is determined by the thickness of the upper gap layer 26. A read gap length GL is set by the total thickness of the lower gap length GL1 and the upper gap length GL2.

In the invention, an insulating layer 28 having a prescribed expanse is formed on the lower shielding layer 20, and an electrode layer 25 of the magnetoresistive effect element 22 is formed on the insulating layer 28, with the lower gap layer 21 interposed therebetween.

No insulating layer 28 is formed, as shown in FIG. 2, under the multilayer film 23 composed of a spin-valve film or the like. If an insulating layer 28 is formed under the multilayer film 23, the substantial lower gap length GL1 between the multilayer film 23 and the lower shielding layer 20 would become excessively large and cannot cope with the tendency toward a higher recording density.

Therefore, the insulating layer 28 should preferably be arranged on the both sides of the multilayer film 23, or on the both sides of the reproducing track width RTw. This arrangement permits reduction of the lower gap length GL1 within the reproducing track width TRw, coping with the tendency toward a higher recording density, improvement of insulation within the reproducing track width, and inhibition of occurrence of smearing.

Also as shown in FIG. 2, the insulating layer 28 has a thickness h1. In the invention, the insulating layer 28 thickness h1 and the lower gap length GL1 should preferably have a total thickness of at least 700 Å. With a thickness of at least 700 Å, it is possible to maintain a satisfactory electric insulation between the electrode layer 25 and the lower shielding layer 20.

Further as shown in FIG. 2, a slant 28a should preferably be formed on each of the sides of the insulating layer 28. By providing the insulating layer 28 on the lower shielding layer 20, a step is produced on the surface of the lower gap layer 21 at a position where the magnetoresistive effect element 22 is to be formed. By providing the slant 28a on the insulating layer 28, it is possible to form the surface of the lower gap layer 21 into a slow step, and inhibit a decrease in the pattern accuracy upon forming the magnetoresistive effect element 22.

In order to form the slant 28a on the side of the insulating layer 28, anisotropic etching or isotropic etching is used as described later. With a view not to causing a damage to the surface of the lower shielding layer, a material for the insulating layer 28 is appropriately selected.

In the invention, the insulating layer should preferably be made of one or more insulating materials selected from the group consisting of $SiO_2$, $Al_2O_3$, $Ta_2O_5$, $TiO$, $Ti_2O_3$, $Ti_3O_5$, $WO_3$, $Si_3N_4$, and $AlN$.

The range of formation of the insulating layer 28 will now be described.

As shown in FIG. 1, the multilayer film 23 composing the magnetoresistive effect element 22, the hard magnetic bias layers (not shown) formed on the both sides of the multilayer film 23 and the electrode layer 25 are exposed on the ABS (air bearing surface) plane as well, and the electrode layer 25 extends beyond the multilayer film 23 and the hard magnetic bias layer further rearward (in the height direction: Y-direction).

As shown in FIG. 1, the electrode layer 25 is formed so that the width thereof becomes larger from the ABS plane toward the rear side.

Also as shown in FIG. 1, the insulating layer (within the range marked with dots) 28 formed between the lower gap layer 21 and the lower shielding layer 20 (see FIG. 2) is formed on substantially the entire region under the electrode layer 25 forming the magnetoresistive effect element 22. As shown in FIG. 1, the insulating layer 28 is not formed under the multilayer film 23 composing the magnetoresistive effect element 22.

In the invention, as shown in FIG. 1, the insulating layer 28 is formed to reach the ABS plane and is exposed from the ABS plane. In this exposed state of the insulating layer 28 from the ABS plane, the distance between the electrode layer 25 and the lower shielding film 20 becomes longer as compared with the conventional art in the presence of the insulating layer 28. Therefore, even when smearing is caused between the electrode layer 25 and the lower shielding layer 20 by grinding upon application of a grinding fabrication for achieving a prescribed length of the multilayer film in the height direction through grinding (height-making fabrication) of the ABS plane of the multilayer film 23, electric connection between the electrode layer 25 and the lower shielding layer 20 becomes more difficult, thus permitting height-making fabrication appropriately while measuring DC resistance value of the multilayer film 23.

While the forming range of the insulating layer 28 may be outside the range shown by a dotted line in FIG. 2, the insulating layer 28 should preferably be formed under the electrode layer 25 formed with a larger width at least on the rear side of the multilayer film 23. In the rear region, the electrode layer 25 occupies a large area on the lower gap layer 21. Therefore, upon occurrence of pinholes or the like in the lower gap layer 21, the lower shielding layer 20 and the electrode layer 25 become more easily connectable electrically.

Figure 3:
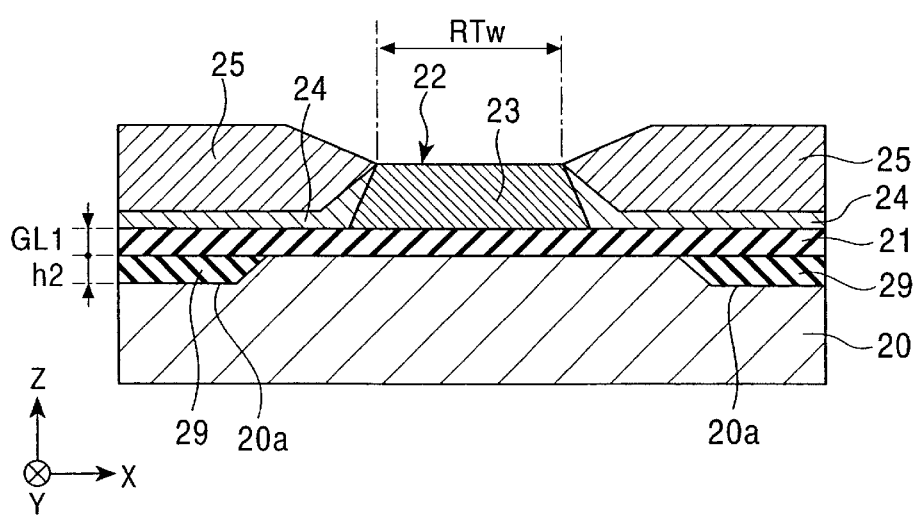
FIG. 3 is a partial sectional view illustrating the structure of a thin-film magnetic head of a second embodiment of the invention.

FIG. 3 is a partial sectional view illustrating the structure of another embodiment of the thin-film magnetic head of the invention. In FIG. 3, symbols X, Y and Z represent an X coordinate axis, a Y coordinate axis, and a Z coordinate axis, respectively. In FIG. 3, the upper gap layer 26 and the upper shielding layer 27 (see FIG. 2) formed on the magnetoresistive effect element 22 are omitted.

A recess 20a having a certain depth h2 is formed on the surface of the lower shielding layer 20 shown in FIG. 3, and an insulating layer 29 is formed in this recess 20a.

In the invention, the surface of the insulating layer 29 should preferably be flush with the surface of the lower shielding layer 20. By forming:,the surface of the insulating layer 29 flush with the surface of the lower shielding layer 20, it is possible to improve the pattern accuracy upon forming the magnetoresistive effect element 22.

As shown in FIG. 3, a lower gap layer 21 is formed on an area covering both the insulating layer 29 surface and the lower shielding layer 20 surface. In the invention, the total thickness of the thickness h2 of the insulating layer 29 and the thickness (gap length) GL1 of the lower gap layer 21 should preferably be at least 700 Å. The magnetoresistive effect element 22 is formed on the lower gap layer 21.

Also as shown in FIG. 3, the multilayer film 23 forming the magnetoresistive effect element 22 is formed on the portion of the lower gap layer 21 on which an insulating layer 29 is not formed. The electrode layer 25 formed in expansion on the rear side (in the Y-direction in the drawing) of the multilayer film 23 (see FIG. 1)l is formed on the lower gap layer 21 having the insulating layer 29 formed thereon.

The insulating layer 29 in this embodiment may be made of any insulating material including, for example, $Al_2O_3$ (alumina) used conventionally as an insulating material.

In this embodiment as well, the insulating layer 29 should preferably be exposed up to the ABS plane, because, even upon occurrence of smearing, electric contact becomes more difficult between the lower shielding layer 20 and the electrode layer 25 forming the magnetoresistive effect element 22. It is thus possible to apply height-making fabrication while appropriately measuring DC resistance value of the multilayer film 23.

In the embodiments shown in FIGS. 1 to 3, the insulating layers 28 and 29 are formed between the lower shielding layer 20 and the lower gap layer 21. In the invention, however, the insulating layer may be formed on the lower shielding layer 20 via the lower gap layer 21.

Figure 4:
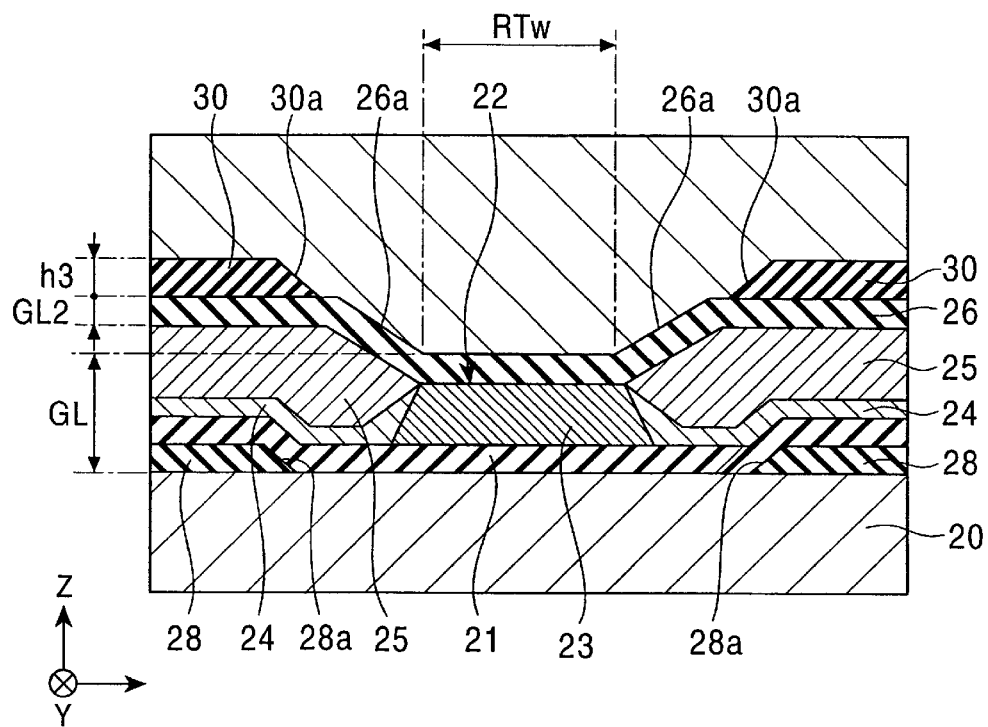
FIG. 4 is a partial sectional view illustrating the structure of a thin-film magnetic head of a third embodiment of the invention.

FIG. 4 is a partial sectional view illustrating the structure of another embodiment of the thin-film magnetic head of the invention. In FIG. 4, symbols X, Y and represent an X coordinate axis, a Y coordinate axis, and a Z coordinate axis, respectively.

In FIG. 4, an insulating layer 30 is formed on the upper gap layer 26 formed on the magnetoresistive effect element 22. The insulating layer 30 is formed on the upper gap layer 26 formed on the electrode layer 25 forming the magnetoresistive effect element 22. Reference numeral 26a indicates the slants of the upper gap layer 26. The insulating layer 30 is not formed on the multilayer film 23.

As shown in FIG. 4, the insulating layer 30 is formed with a thickness h3. In the invention, the total thickness of the thickness of the insulating layer 30 and the thickness of the upper gap layer 26 (upper gap length) should preferably be at least 700 Å. This is to improve electric insulation between the electrode layer 25 and the upper shielding layer 27. A reproducing track width RTw is formed by the distance between the electrode layers 25 and 25.

A slant 30a should preferably be formed on the side of the insulating layer 30.

Further, in the invention, the insulating layer 30 should preferably be formed to reach the ABS plane, and exposed from the ABS plane.

The insulating layer 30 should preferably be made of one or more insulating materials selected from the group consisting of $SiO_2$, $Al_2O_3$, $Ta_2O_5$, $TiO$, $Ti_2O_3$, $Ti_3O_5$, $WO_3$, $Si_3N_4$ and AlN, as in the insulating layer 28 formed between the lower shielding layer 20 and the lower gap layer 21 shown in FIG. 2, by the use of anisotropic etching, isotropic etching or the lift-off method.

As shown in FIG. 4, by forming the insulating layer 30, in addition to the upper gap layer 26, between the electrode layer 25 and the upper shielding layer 27, the distance between the electrode layer 25 and the upper shielding layer 27 becomes longer as compared with the conventional art. Even upon occurrence of defects such as pinholes in the electrode layer 25, it is possible to keep a satisfactory electrical insulation between the electrode layer 25 and the upper shielding layer 27. Moreover, when the insulating layer is exposed to reach the ABS plane, it is possible to keep a satisfactory electrical insulation between the electrode layer 25 and the upper shielding layer 27 and carry out height-making fabrication appropriately while measuring DC resistance value of the multilayer film, when applying height-making fabrication.

The insulating layer 30 should preferably be arranged on the both sides of the multilayer film 23 or on the both sides of the reproducing track width RTw. By adopting this position, it is possible to reduce the upper gap length GL2 within the range of the reproducing track width RTw, cope with the tendency toward a higher recording density, improve insulation outside the range of the reproducing track width, and inhibit occurrence of smearing.

In FIG. 4, the insulating layer 28 having the slant 28a is formed on the lower shielding layer 20, and further, the lower gap layer 21 is formed over an area covering the insulating layer 28 and the lower shielding layer 20. In the invention, as in the embodiment shown in FIG. 3, a recess 20a may be formed on the lower shielding layer 20, and the insulating layer 29 may be formed in this recess 20a. It is not always necessary to form the insulating layers 28 and 29 between the lower shielding layer 20 and the electrode layer 25.

Figure 5:
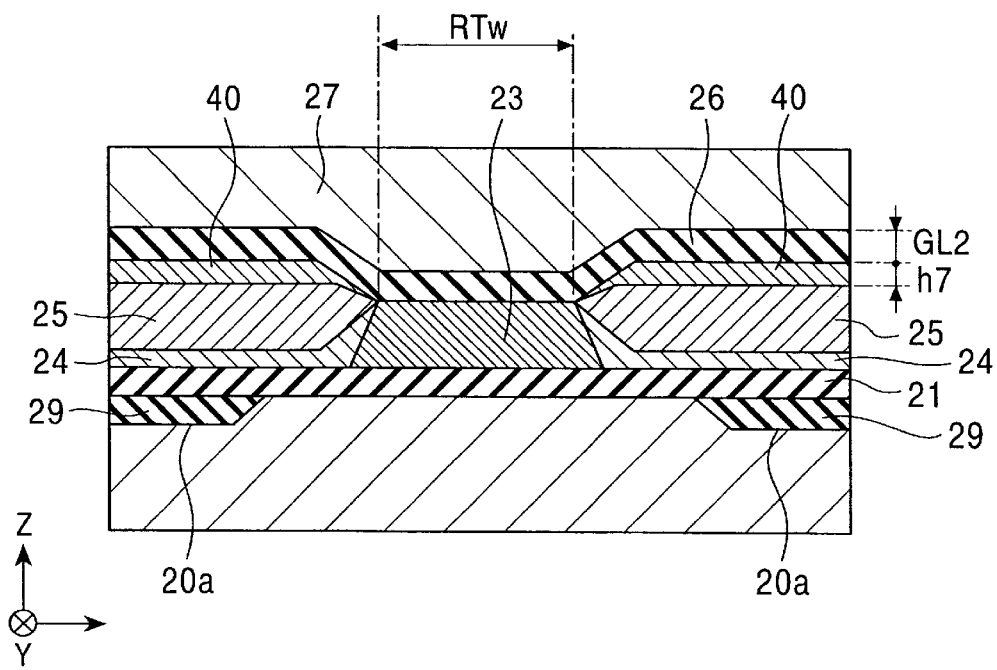
FIG. 5 is a partial sectional view illustrating the structure of a thin-film magnetic head of a fourth embodiment of the invention.

FIG. 5 is a partial sectional view illustrating the structure of another embodiment of the thin-film magnetic head of the invention. In FIG. 5, symbols X, Y and Z represent an X coordinate axis, a Y coordinate axis, and a Z coordinate axis, respectively.

In this embodiment also, as in FIG. 4, an insulating layer 40 is formed, in addition to the upper gap layer 26, between the electrode layer 25 and the upper shielding layer 27. In FIG. 5, the insulating layer 40 is formed directly on the upper surface of the electrode layer 25.

In FIG. 5, the entire upper surface of the electrode layer 25 is completely covered with the insulating layer 40. As compared with the embodiment shown in FIG. 4, it is possible to achieve a better electrical insulation between the electrode layer 25 and the upper shielding layer 27.

The insulating layer 40 may be made of any insulating material including, for example, $Al_2O_3$ (alumina) used conventionally as an insulating material.

In FIG. 5, the insulating layer 40 should preferably be exposed to reach the ABS plane.

As shown in FIG. 5, the insulating layer 40 is formed with a thickness h7, and the total thickness of the film thickness h7 and the thickness of the upper gap layer 26 (upper gap length) GL2 should preferably be at least 700 Å. This is to improve electrical insulation between the electrode layer 25 and the upper shielding layer 27.

In the embodiment shown in FIG. 5, as described above, the insulating layer 40 is formed between the electrode layer 25 and the upper shielding layer 27, thus making it possible to keep a satisfactory electrical insulation between the electrode layer 25 and the upper shielding layer 27.

While in FIG. 5, the recess 20a is formed in the lower shielding layer 20, and the insulating layer 29 is formed in this recess 20a, an insulating layer 28 having a slant 28a may be formed on the lower shielding layer 20. It is not always necessary to form the insulating layer 29 between the lower shielding layer 20 and the electrode layer 25.

The manufacturing method of the thin-film magnetic head in the invention will now be described with reference to the drawings. The manufacturing process described below is the manufacturing method of the portion where the multilayer film 23 of the magnetoresistive effect element 22 appears on the cross-section.

FIGS. 6 to 9 illustrate the processes regarding the first manufacturing method of the thin-film magnetic head of the invention.

Figure 6:
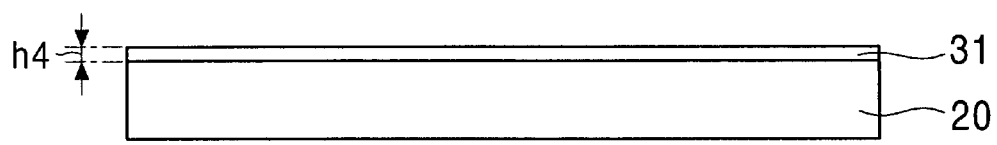
FIG. 6 is a process diagram illustrating a manufacturing method of a thin-film magnetic head of the invention.

The process shown in FIG. 6 is to form an insulating material layer 31 made of one or more insulating materials selected from the group consisting of $SiO_2$, $Al_2O_3$, $Ta_2O_5$, TiO, $Ti_2O_3$, $Ti_3O_5$, $WO_3Si_3N_4$ and AlN on the entire surface of the lower shielding layer 20 into the thickness h4.

Figure 7:
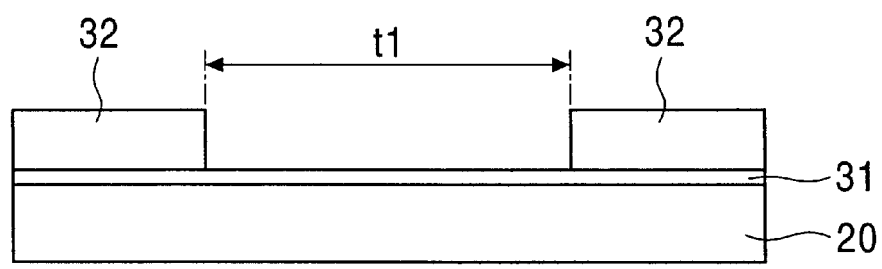
FIG. 7 is a process diagram of a process next to that shown in FIG. 6.

Then, as shown in FIG. 7, a resist layer 32 is formed at a certain distance t1 on the insulating material layer 31. The distance t1 is larger than the width of the multilayer film 23 of the magnetoresistive effect element 22 formed in a subsequent step.

Figure 8:
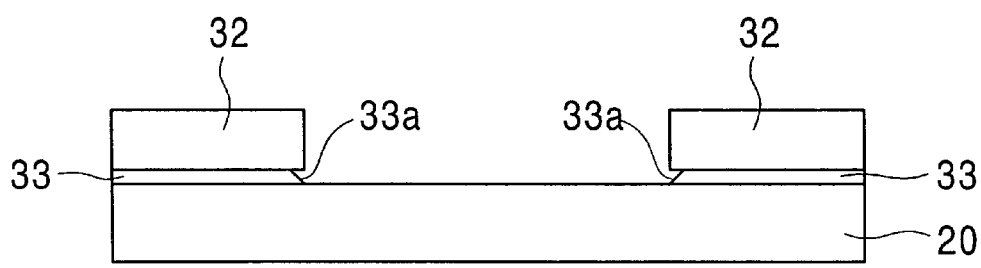
FIG. 8 is a process diagram of a process next to that shown in FIG. 7.

In the process shown in FIG. 8, the insulating material layer 31 not covered with the resist layer is removed by the application of isotropic plasma etching using $CF_4$ gas or $BCl_3$ gas. The above-mentioned insulating materials $SiO_2$, $Ta_2O_3$, TiO, $Ti_2O_3$, $Ti_3O_5$, $WO_3$ and $Si_3N_4$ are etchable by isotropic plasma etching of $CF_4$ gas. By using $CF_4$ gas, etching never causes a damage to the surface of the lower shielding layer 20.

Etching of $Al_2O_3$ or AlN is possible with $BCl_3$ gas. Upon this etching, the surface of the lower shielding layer 20 is also affected by etching. By properly controlling the etching rate and the like, however, the surface of the lower shielding layer 20 is hardly etched.

Further, by carrying out rinsing after the completion of isotropic plasma etching, corroded portions of the surface of the lower shielding layer 20 are properly removed, thus making it possible to form a pattern of the insulating material layer 31 without causing a damage to the lower shielding layer 20 by etching.

The insulating material layer 31 remaining under the resist layer 32 shown in FIG. 8 is an insulating layer 33, and a slant 33a is formed on the side of this insulating layer 33 as a result of use of the isotropic etching.

Figure 9:
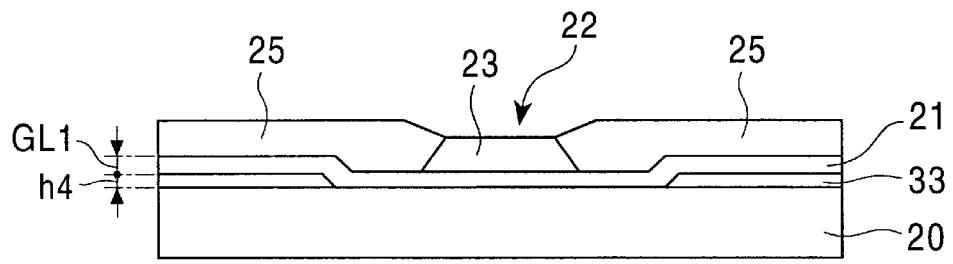
FIG. 9 is a process diagram of a process next to that shown in FIG. 8.

As shown in FIG. 9, the lower gap layer 21 is formed on an area covering the insulating layer 33 and the lower shielding layer 20 after removing the resist layer 32. At this point, the total thickness of the thickness h4 of the insulating layer 33 and the thickness (lower gap length) GL1 of the lower gap layer 21 should preferably be at least 700 Å.

Also as shown in FIG. 9, a multilayer film 23 of the magnetoresistive effect element. 22 is formed on the lower gap layer 21 not having the insulating layer 33 formed thereon on the lower shielding layer 20, and the electrode layer 25 of the magnetoresistive effect element 22 is formed on the lower gap layer 21 overlapping the insulating layer 33, on the lower shielding layer 20.

FIGS. 10 to 13 illustrate processes in a second manufacturing method of the thin-film magnetic head of the invention.

Figure 10:
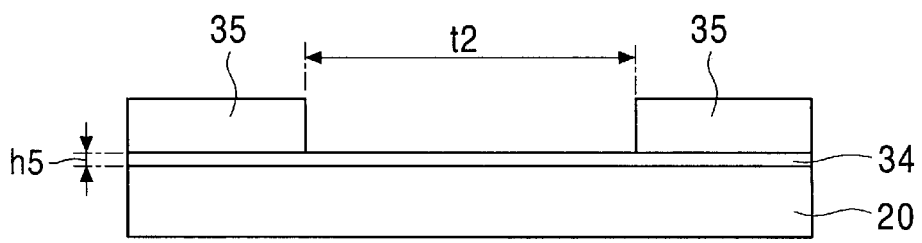
FIG. 10 is a process diagram illustrating a second manufacturing method of a thin-film magnetic head of the invention.

First, in the process shown in FIG. 10, an insulating material layer 34 made of one or more insulating materials selected from the group consisting of $SiO_2$, $Al_2O_3$, $Ta_2O_5$, TiO, $Ti_2O_3$, $Ti_3O_5$, $WO_3$, $Si_3N_4$ and AlN is formed on the entire surface of the lower shielding layer 20 into a thickness h5.

Then, as shown in FIG. 10, a resist layer 35 is formed on the insulating material layer 34 at a certain distance t2. The distance t2 is larger than the width of the multilayer film 23 of the magnetoresistive effect element 22 formed in a subsequent process.

Figure 11:
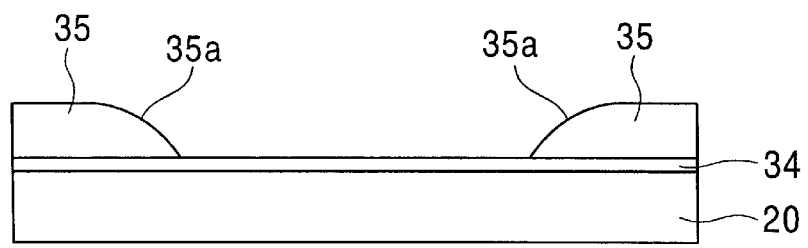
FIG. 11 is a process diagram of a process next to that shown in FIG. 10.

In the process shown in FIG. 11, a heat treatment is applied to the resist layer 35 to produce smearing on the surface of the resist layer 35, thereby forming a slant 35a on the side of the resist layer 35.

Figure 12:
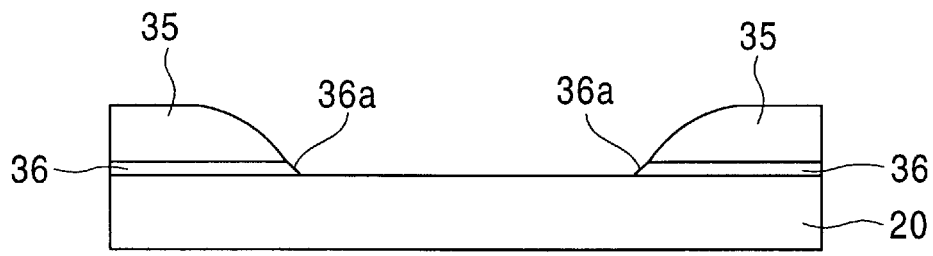
FIG. 12 is a process diagram of a process next to that shown in FIG. 11.

In the process shown in FIG. 12, the insulating material layer 34 not covered with the resist layer 35 is removed by an anisotropic etching method such as RIE based on $CF_4$ gas or $BCl_3$ gas. The above-mentioned insulating materials such as $SiO_2$, $Ta_2O_5$, TiO, $Ti_2O_3$, $Ti_3O_5$, $WO_3$ and $Si_3N_4$ are etchable by the anisotropic etching method based on $CF_4$ gas. By using $CF_4$ gas, therefore, etching never cause a damage to the surface of the lower shielding layer 20 made of permalloy or the like.

$Al_2O_3$ and AlN are etchable with $BCl_3$ gas. Upon etching, the lower shielding layer 20 is also affected by etching. By properly controlling the etching rate and the like, however, the surface of the lower shielding layer 20 is hardly etched. Moreover, by applying rinsing after the completion of anisotropic etching (for example, RIE (reactive ion etching method)), corroded portions on the surface of the lower shielding layer 20 are appropriately removed, and it is possible to form a pattern on the insulating material layer 34 without causing any damage to the lower shielding layer 20 by etching.

The insulating material layer 34 remaining under the resist layer 35 shown in FIG. 12 is an insulating layer 36, and a slant 36a is formed on the side of this insulating layer 36.

The reason of formation of the slant 36a on the side of the insulating layer 36 is as follows. By forming the slant 35a on the side by applying a heat treatment to the resist layer 35 as shown in FIG. 11, the thickness of the portion of the resist layer 35 at the slant 35a is reduced, and as a result, the resist layer 35 at the slant 35a is ground off under the effect of etching in response to the thickness of the slant 35a. Therefore, by grinding of the resist layer in response to the thickness of the slant 35a, the side of the insulating layer 36 formed under the slant 35a of the resist layer 35 is also ground off under the effect of etching, thus forming the slant 36a.

Figure 13:
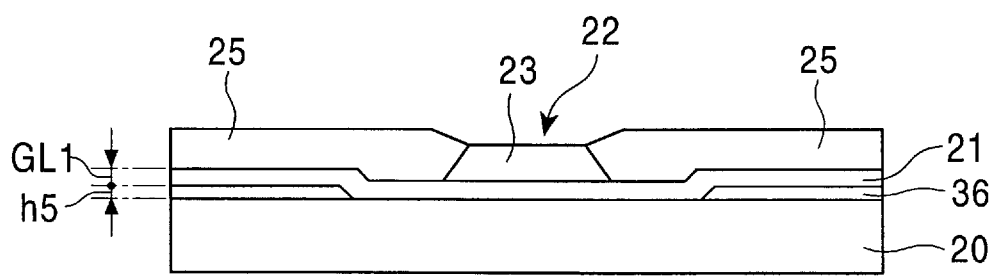
FIG. 13 is a process diagram of a process next to that shown in FIG. 12.

In the process shown in FIG. 13, the lower gap layer 21 is formed on an area covering the insulating layer 36 and the lower shielding layer 20 after removing the resist layer 35. At this point, the total thickness of the thickness h5 of the insulating layer 36 and the thickness (lower gap length) GL1 of the lower gap layer 21 should preferably be at least 700 Å.

As shown in FIG. 13, the multilayer film 23 of the magnetoresistive effect element 22 is formed on the lower gap layer 21 not having an insulating layer 36 formed thereon, on the lower shielding layer 20, and the electrode layer 25 of the magnetoresistive effect element 22 is formed on the lower gap layer 21 overlapping the insulating layer 36, on the lower shielding layer 20.

Further as shown in FIG. 4, when forming the insulating layer 30, via the upper gap layer 26, on the electrode layer 25 of the magnetoresistive effect element 22, it is desirable to use any of the manufacturing method using the anisotropic etching method shown in FIGS. 6 to 9 and the manufacturing method using the isotropic etching method as shown in FIGS. 10 to 13.

FIGS. 14 to 17 illustrate processes regarding a third manufacturing method of the thin-film magnetic head of the invention.

Figure 14:
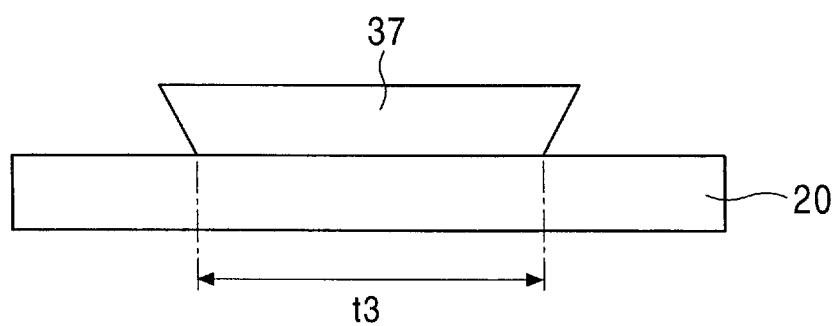
FIG. 14 is a process diagram illustrating a third manufacturing method of a thin-film magnetic head of the invention.

In the process shown in FIG. 14, a lift-off resist layer 37 having a certain width t3 is formed on the lower shielding layer 20.

Figure 15:
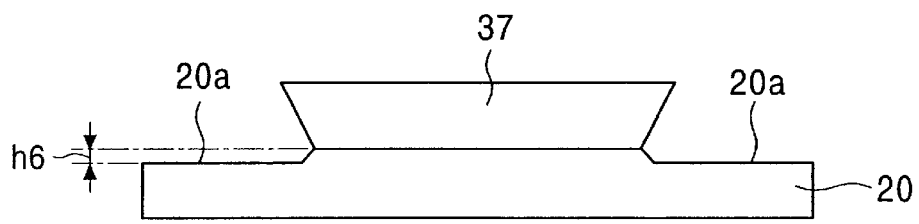
FIG. 15 is a process diagram of a process next to that shown in FIG. 14.

In the process shown in FIG. 15, the surface of the lower shielding layer 20 not covered with the resist layer 37 is ground of to a depth h6 by the ion milling method. As a result, a recess 20a having a depth h6 is formed on the surface of the lower shielding layer 20.

Figure 16:
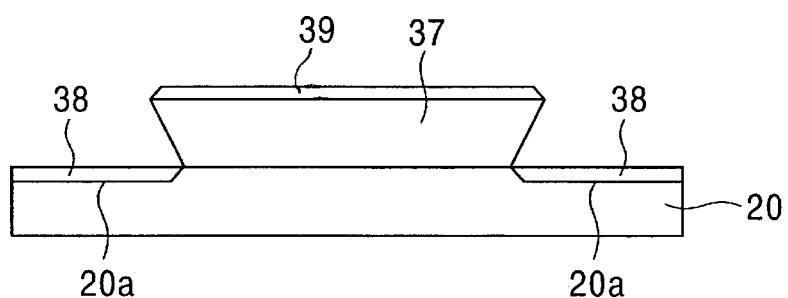
FIG. 16 is a process diagram of a process next to that shown in FIG. 15.

In the process shown in. FIG. 16, an insulating layer 38 is formed, by sputtering or the ion beam depositing method such as ion beam sputtering, in the recess 20a formed on the surface of the lower shielding layer 20. At this point, the surface of the insulating layer 38 should preferably be flush with the surface of the lower shielding layer 20.

The insulating layer 38 may be made of any insulating material.

As shown in FIG. 16, an insulating material layer 39 is formed also on the resist layer 37 by forming the insulating layer 38 in the recess 20a formed on the surface of the lower shielding layer 20 by sputtering or by the ion beam deposition method such as ion beam sputtering.

Figure 17:
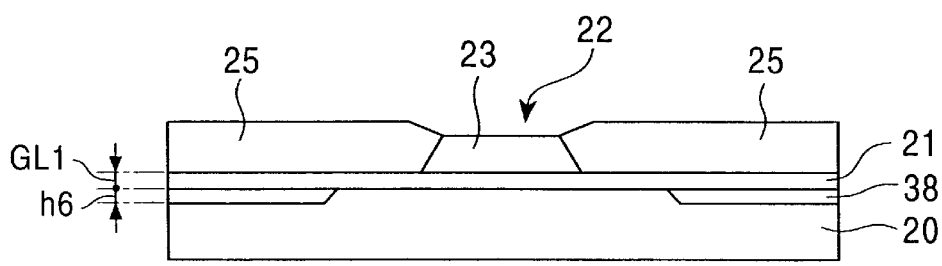
FIG. 17 is a process diagram of a process next to that shown in FIG. 16.

In the process shown in FIG. 17, the resist layer 37 is removed by lifting off, and the lower gap layer 21 is formed on the surface of the lower shielding layer 20 from the surface of the insulating layer 38. At this point, the total thickness of the thickness h6 of the insulating layer 38 and the thickness (lower gap length) GL1 of the lower gap layer 21 should preferably be at least 700 Å.

As shown in FIG. 17, the multilayer film 23 of the magnetoresistive effect element 23 is formed on the lower gap layer 21 not having the insulating layer 38 formed thereon, on the lower shielding layer 20. The electrode layer 25 of the magnetoresistive effect element 22 is formed on the lower gap layer 21 overlapping the insulating layer 38.

The electrode 25 of the magnetoresistive effect element 22 is thus formed on the lower gap layer 21 having the insulating layer formed thereon, and after forming the multilayer film 23 on the lower gap layer 21 not having a insulating layer formed thereon, the upper gap layer 26 is formed on the magnetoresistive effect element 22. Then, an upper shielding layer 27 is then formed on the upper gap layer 26.

Figure 18:
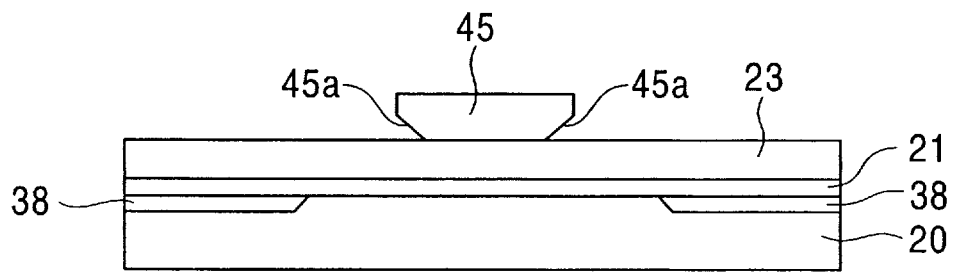
FIG. 18 is a process diagram illustrating a fourth manufacturing method of a thin-film magnetic head of the invention.
Figure 19:
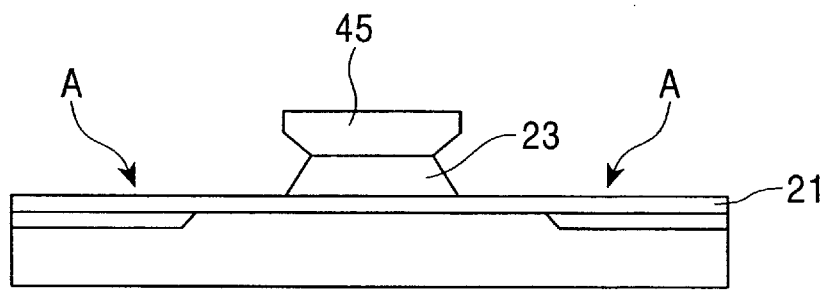
FIG. 19 is a process diagram of a process next to that shown in FIG. 18.
Figure 20:
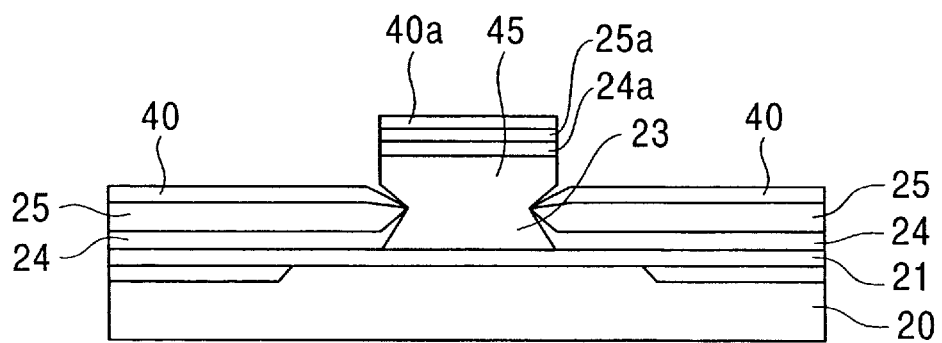
FIG. 20 is a process diagram of a process next to that shown in FIG. 19.
Figure 21:
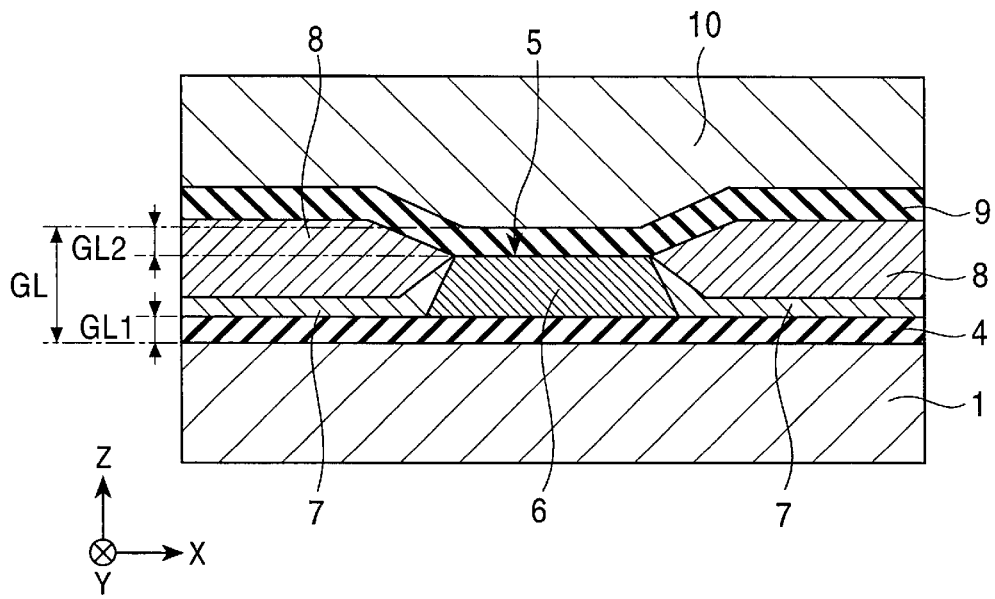
FIG. 21 is a partial sectional view illustrating the structure of a thin-film magnetic head in the conventional art.
Figure 22:
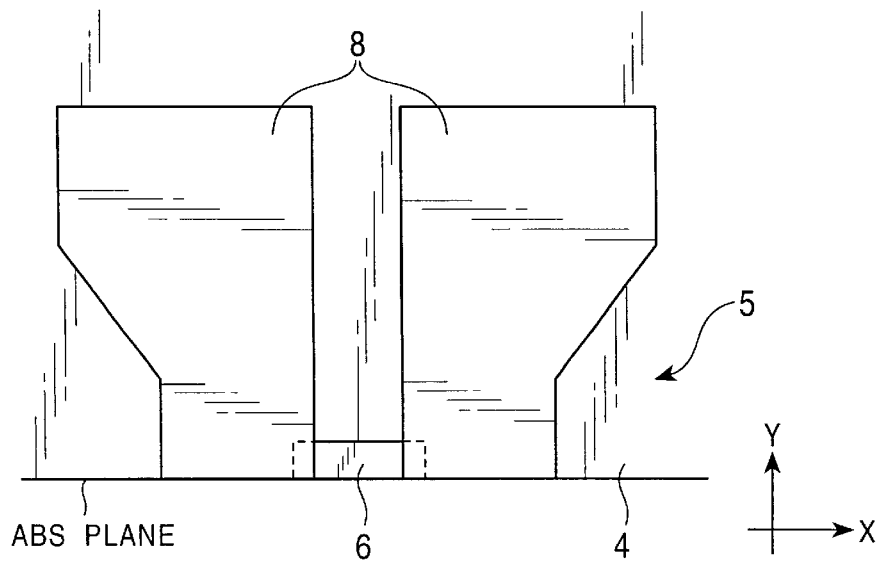
FIG. 22 is a partial plan view illustrating the structure of a magnetoresistive effect element formed on a lower gap layer in the conventional art.

FIGS., 18 to 20 illustrate processes regarding the fourth manufacturing method of the thin-film magnetic head of the invention. FIGS. 18 to 20 illustrate the processes for forming an insulating layer between the upper shielding layer 27 composing the thin-film magnetic head and the electrode layer 25 of the magnetoresistive effect element 22.

In the process shown in FIG. 18, an recess 20a is formed on the lower shielding layer 20 by the use of the manufacturing method shown in FIGS. 14 to 16. After forming an insulating layer 38 in this recess 20a, the lower gap layer 21 is formed on an area covering the lower shielding layer 20 and the insulating layer 38. It is not always necessary to form the insulating layer 38.

Then, as shown in FIG. 18, the multilayer film 23 is formed on the entire surface of the lower gap layer 21. Then, a lift-off resist layer 45 is formed on the multilayer film 23. As shown in FIG. 18, a notch 45a is provided on the lower surface of the resist layer 45.

In the process shown in FIG. 19, the multilayer film 23 not covered with the lift-off resist layer 45 is removed by etching. As a result, the multilayer film 23 in a prescribed shape remains under the resist layer 45.

Then, a hard magnetic bias layer 24 and the electrode layer 25 are laminated in the areas on the both sides of the multilayer film 23 remaining on the lower gap layer 21 shown in FIG. 19 (see FIG. 20).

Further, as shown in FIG. 20, an insulating layer 40 is formed on the electrode layer 25 formed in areas A on each of the both sides of the multilayer film 23. The hard magnetic bias layer 24, the electrode 25 and the insulating 40 are thus continuously formed by the sputtering method or the vapor deposition method in the areas A on the both sides on the lower gap layer 21. A layer 24a of the hard magnetic bias material, a layer 25a of the electrode material, and a layer 40a of the insulating material are formed also on the lift-off resist layer 45 by the above-mentioned continuous film forming.

By removing the resist layer 45 shown in FIG. 20, and forming the upper shielding layer 27 via the upper gap layer 26 over the insulating layer 40 and the multilayer film 23, the thin-film magnetic head as shown in FIG. 5 is completed.

According to the manufacturing method as described above, it is possible to form the insulating layer 40 on the entire surface of the electrode layer 25 composing the magnetoresistive effect element 22. As described above, it is possible to form the insulating layer 30 via the upper gap layer 26 on the electrode layer 25 of the magnetoresistive effect element 22, as shown in FIG. 4, by the manufacturing method shown in FIGS. 6 to 9 or FIGS. 10 to 13. According to this method, however, the slant 26a is formed on the upper gap layer 26 as shown in FIG. 4. It is difficult, from the manufacturing point of view, to form the insulating layer 30 to reach the slant 26a.

As shown in FIG. 4, the, electrode layer 25 is present under the slant 26a of the upper gap layer 26. It is therefore difficult, by the manufacturing method shown in FIGS. 6 to 9 or FIGS. 10 to 13, to completely cover the electrode layer 25 with the insulating layer 30. According to the manufacturing method shown in FIGS. 18 to 20, however, the insulating layer 40 can be formed continuously by sputtering or vapor deposition on the electrode layer formed on the both sides of the multilayer film 23, thus making it possible to completely cover the entire electrode layer 25 with the insulating layer 40, and to maintain a satisfactory electrical insulation between the upper shielding layer 27 and the electrode layer 25.

According to the present invention, as described above in detail, it is possible to provide a larger gap between the electrode layer and the shielding layer by forming the gap layer into a small thickness and forming an insulating layer, in addition to the gap layer, between the electrode layer and the shielding layer. Even upon occurrence of defects such as pinholes in the gap layer, or occurrence of smearing during height-making fabrication, it is possible to keep satisfactory electrical insulation between the electrode layer and the shielding layer. At the same time, gap layers of small thicknesses can be formed on and under the multilayer film of the magnetoresistive effect element, thus permitting coping with the tendency toward a higher recording density.

By adopting a total thickness of the thickness of the insulating layer and the thickness of the gap layer of at least 700 Å, it is possible to maintain a better electrical insulation between the electrode layer and the shielding layer.

What is claimed is:

1. A thin-film magnetic head comprising a lower shielding layer and a lower gap layer formed thereon, a magnetoresistive element comprising a multilayer film displaying magnetoresistive effect and formed on said lower gap layer and an electrode layer connected to said multilayer film, and an upper shielding layer formed on said magnetoresistive element with an upper gap layer provided therebetween;

wherein a recess is formed on the surface of said lower shielding layer in a surrounding region on each side of the multilayer film in a track width direction, said recess having a depth that is less than a total thickness of the lower shielding layer, wherein the lower shielding layer has a central portion disposed beneath the multilayer film and between the recess formed in the surrounding region on each side of the multilayer film in the track width direction, and has an outer portion that extends beneath the recess formed in the surrounding region on each side of the multilayer film in the track width direction, and wherein an insulating layer is formed in said recess between the outer portion of the lower shielding layer and a portion of the lower gap layer, the insulating layer having a planar uppermost surface that is in the same plane as an upper-most surface of the central portion of the lower shielding layer adjacent to the recess, the lower gap layer having a lower surface that is disposed against the upper-most surface of the insulating layer and the upper-most surface of the central portion of the lower shielding layer so as to extend along a single common plane, said insulating layer insulating the lower shielding layer and the lower gap layer in the surrounding region on each side of the multilayer film.

2. A thin-film magnetic head according to claim 1, wherein said lower gap layer and the insulating layer have a total thickness of at least 700 Å.

3. A thin-film magnetic head according to claim 1, wherein said insulating layer has a slanted face formed along an edge of the insulating layer adjacent to the side of the multilayer film so that the thickness of said insulating layer decreases as the insulating layer nears the side of the multilayer film.

4. A thin-film magnetic head according to claim 1, wherein said insulating layer is formed of one or more insulating materials selected from the group consisting of $SiO_2$, $Al_2O_3$, $Ta_2O_5$, $TiO$, $Ti_2O_3$, $Ti_3O_5$, $WO_3$, $Si_3N_4$ and AlN.

5. A thin-film magnetic head according to claim 1, wherein the insulating layer is formed by exposing up to an ABS plane.

* * * * *